(12) United States Patent
Damnjanovic et al.

(10) Patent No.: US 11,159,800 B2
(45) Date of Patent: Oct. 26, 2021

(54) ADAPTIVE BIT RATE RATIO CONTROL

(71) Applicant: V-NOVA INTERNATIONAL LIMITED, London (GB)

(72) Inventors: Ivan Damnjanovic, London (GB); Matthew Compton, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 16/844,389

(22) Filed: Apr. 9, 2020

(65) Prior Publication Data

US 2020/0304803 A1  Sep. 24, 2020

Related U.S. Application Data

(63) Continuation of application No. 15/779,193, filed as application No. PCT/GB2016/053736 on Nov. 28, 2016, now Pat. No. 10,623,745.

(30) Foreign Application Priority Data

Nov. 27, 2015 (GB) ..................... 1521013

(51) Int. Cl.
*H04N 19/146* (2014.01)
*H04N 19/115* (2014.01)
(Continued)

(52) U.S. Cl.
CPC ............ *H04N 19/146* (2014.11); *H04N 7/24* (2013.01); *H04N 19/115* (2014.11);
(Continued)

(58) Field of Classification Search
None
See application file for complete search history.

(56) References Cited

U.S. PATENT DOCUMENTS 10,623,745 B2  4/2020 Damnjanovic et al.
2005/0058200 A1  3/2005 Lu et al.
(Continued)

FOREIGN PATENT DOCUMENTS

EP  2643969  10/2013
WO  2011-084918  7/2011

OTHER PUBLICATIONS

Balaji L, Thyaharajan KK, "An adaptive rate control scheme for H. 264 scalabe video coding", In2013 International Conference on Green Computing, Communication and Conservation of Energy (ICGCE), Dec. 12, 2013, pp. 40-44, IEEE.
(Continued)

*Primary Examiner* — Clifford Hilaire
(74) *Attorney, Agent, or Firm* — Workman Nydegger (57) ABSTRACT

A system for encoding a sequence of frames (171) of a data signal. The system comprises: a first encoding system (120) comprising at least: a first encoder (130) configured to encode the sequence of frames (171) according to a first encoding algorithm; and a first rate control unit (135) configured to control a first bit rate at which the first encoder (130) encodes said sequence of frames (171); a second encoding system (100) comprising at least: a second encoder (116) configured to encode a second sequence of frames (175) associated with the sequence of frames (171) according to a second encoding algorithm; and a second rate control unit (135) configured to control a second bit rate at which the second encoder (130) encodes said second sequence of frames (175) associated with the sequence of frames (171).

14 Claims, 4 Drawing Sheets

(51) Int. Cl.
  *H04N 19/33*    (2014.01)
  *H04N 19/124*   (2014.01)
  *H04N 19/14*    (2014.01)
  *H04N 19/187*   (2014.01)
  *H04N 7/24*     (2011.01)

(52) U.S. Cl.
  CPC ........... *H04N 19/124* (2014.11); *H04N 19/14* (2014.11); *H04N 19/187* (2014.11); *H04N 19/33* (2014.11)

(56)  References Cited

U.S. PATENT DOCUMENTS

| | | |
|---|---|---|
| 2006/0018254 A1 | 1/2006 | Sanders et al. |
| 2013/0322524 A1 | 12/2013 | Jang et al. |
| 2014/0010294 A1* | 1/2014 | Ye .................. H04N 19/70 375/240.12 |
| 2015/0304674 A1 | 10/2015 | Lee et al. |
| 2016/0127626 A1 | 5/2016 | Horigome et al. |

OTHER PUBLICATIONS

U.S. Appl. No. 15/779,193, dated Aug. 9, 2019, Office Action.
U.S. Appl. No. 15/779,193, dated Dec. 15, 2019, Notice of Allowance.

* cited by examiner

ADAPTIVE BIT RATE RATIO CONTROL

CROSS-REFERENCE TO RELATED APPLICATION

This application is a continuation of U.S. patent application Ser. No. 15/779,193, filed May 25, 2018, which is a 371 National Stage Application of PCT/GB2016/053736, filed Nov. 28, 2016, which claims priority to United Kingdom Application No. 1521013.1, filed on Nov. 27, 2015, the disclosures of which are incorporated herein by reference in their entireties.

TECHNICAL FIELD

The present invention relates to a mechanism to control the bit rate associated with an encoding system.

BACKGROUND

In nowadays system is important to control the rate at which an encoding system generates and transmit encoded data, for example in order to enable a constant bit rate in transmission so that, when a decoding system receives an encoded stream to decode, the decoder can receive a constant bit rate stream (provided the transmission allows a constant bit rate) and decode without having to have too much encoded data to decode or to wait for encoded data before decoding.

The present invention provides a solution to optimise said rate control using a specific encoding structure.

SUMMARY

There is provided a system, apparatus, interface and methods according to the appended claims.

According to a first aspect of the present invention, there is provided a system for encoding a sequence of frames of a data signal, the system comprising a first encoding system comprising at least: a first encoder configured to encode the sequence of frames according to a first encoding algorithm; and a first rate control unit configured to control a first bit rate at which the first encoder encodes said sequence of frames; and a second encoding system comprising at least: a second encoder configured to encode a second sequence of frames associated with the sequence of frames according to a second encoding algorithm; and a second rate control unit configured to control a second bit rate at which the second encoder encodes said second sequence of frames associated with the sequence of frames. The first encoder may be further configured to: generate a first portion of data comprising data corresponding to the sequence of frames encoded according to the first encoding algorithm; conditional on receiving an instruction from the second rate control unit to generate a second portion of data comprising one or more default values for maintaining the first bit rate, generate said second portion of data; and generate a first encoded data stream by combining at least said first and second portions.

In a second aspect there is provided an apparatus for controlling one or more bit rates associated with corresponding one or more encoders, the apparatus for use within the system above, the apparatus comprising an adaptive rate control unit for adaptively modifying the first bit rate and/or the second bit rate according at least in part on a measure of complexity for the sequence of frames and/or an indication of use of default values by at least one of the two encoding system. The apparatus may further comprise a receiving unit for receiving an indication that a number of default values is used or is to be used by at least one of the two encoding systems, and wherein the adaptive rate control unit is further configured to determine, based at least in part on the received indication, to instruct a modification of the second bit rate. The modification corresponds to a modification of one or more parameters resulting in a higher second bit rate. The apparatus may further comprise a transmission unit for sending a signal to the first encoding system, wherein the signal comprises instructions for the first encoding system to reduce the size of the second portion of data. The apparatus of claim may further comprise a transmission unit for sending a signal to the first encoding system, wherein the signal comprises instructions for the first encoding system not to generate any default values for the second portion of data. The apparatus may further comprise a transmission unit for sending a signal to the first encoding system, wherein the signal comprises instructions for the first encoding system to replace one or more of the generated default values with at least part of the second encoded data stream. The apparatus may further comprise a transmission unit for sending a signal to the first encoding system, wherein the signal comprises instructions for the first encoding system to insert at least part of the second encoded data stream into at least a part of the second portion. The apparatus may further comprise a transmission unit for sending a signal to the first encoding system, wherein the signal comprises an indication of a requested second bit rate for the second encoder. The apparatus may further comprise a transmission unit for sending a signal to the first encoding system, wherein the signal comprises an indication of a quantization parameter (QP) for use by the first encoder and/or an indication of a first bit rate for allocation to the first encoder. The apparatus may further comprise a receiving unit for obtaining an indication of a second bit rate requested for the second encoder; a decision unit for determining an optimal bit rate to be allocated for the second encoder, said determination based on a first rate control algorithm; and a transmission unit for sending a signal to the second encoding system wherein the signal comprises an indication of the second bit rate allocated for the second encoder.

In the system, when used in conjunction with the apparatus, the second rate control unit may be further configured to control the second bit rate based on an indication of the second bit rate allocated for the second encoder. The second encoding system may further comprise an analysis unit to generate a measure of complexity for the sequence of frames, wherein the complexity is associated with a frame of the sequence of frames and/or with two or more of the frames within the sequence of frames. In the system, when used in conjunction with the apparatus, the first encoder may be further configured to generate a number of default values for populating said second portion of data, said number being less than a number of default values which would have been generated in the absence of said instructions. In the system, when used in conjunction with the apparatus, the first encoder may be further configured to inhibit generation of any default values for populating said second portion of data. In the system, when used in conjunction with the apparatus, the first encoder may be further configured to inhibiting generation of a number of default values for populating said second portion of data, said number being associated with the size of the at least part of the second encoded data stream to be inserted. In the system, when used in conjunction with the apparatus, the first encoder may be further configured to modify the QP used for the encoding process based on the signal received and/or to modify the first bit rate based on the signal received. In the system, the second encoding system may further comprise a unit for generating a modified first encoded data stream by modifying the first encoded data stream based at least in part on the second encoded data stream. The system may further comprise a multiplexer for multiplexing the modified first encoded data stream with the second encoded data stream to generate a multiplexed data stream for transmission to a decoding system.

In a third aspect there is provided an interface to enable communications between the first encoding system and the second encoding system, the interface comprising at least means for sending a first data stream from the second encoding system to the first encoding system, said first data stream representing a rendition of the sequence of frames; means for sending a second data stream from the first encoding system to the second encoding system, said second data stream corresponding to a re-constructed version of an encoded rendition of the sequence of frames, said encoded rendition being generated by the first encoder according to a first encoding algorithm; means for sending a first signal from the first encoding system to the second encoding system, said signal indicating information to be used by the second encoding system to control the first bit rate and/or the second bit rate; and means for sending a second signal from the second encoding system to the first encoding system, said signal indicating information to be used by the first encoding system to control the first bit rate and/or the second bit rate.

According to a fourth aspect of the present invention, there is provided a method for encoding a sequence of frames of a data signal, the method comprising: encoding the sequence of frames using a first encoding system; encoding a second sequence of frames associated with the sequence of frames using a second encoding system. The first encoding system is adapted to generate a first encoded data stream according to a first bit rate, the second encoding system is adapted to generate a second encoded data stream according to a second bit rate. The method may further comprise adaptively modifying the first bit rate and/or the second bit rate according at least in part on a measure of complexity for the sequence of frames and/or an indication of use of default values by at least one of the two encoding system. The first encoded data stream may comprise a first portion of data comprising data corresponding to the sequence of frames encoded according to a first encoding algorithm; and depending on whether it is needed to maintain the first bit rate in accordance with a first rate control algorithm, a second portion of data comprising one or more default values.

The method may further comprise measuring a complexity for the sequence of frames, wherein the complexity is associated with a frame of the sequence of frames and/or with two or more of the frames within the sequence of frames. The method may further comprise sending a signal to the first encoding system, wherein the signal comprises instructions for the first encoding system to reduce the size of the second portion of data. The method may further comprise generating by the first encoding system a number of default values for populating said second portion of data, said number being less than a number of default values which would have been generated in the absence of said instructions. The method may further comprise sending a signal to the first encoding system, wherein the signal comprises instructions for the first encoding system not to generate any default values for the second portion of data.

The method may further comprise inhibiting the first encoding system from generating any default values for populating said second portion of data. The method may further comprise sending a signal to the first encoding system, wherein the signal comprises instructions for the first encoding system to replace one or more of the generated default values with at least part of the second encoded data stream. The method may further comprise replacing by the second encoding system one or more of the generated default values with at least part of the second encoded data stream. The method may further comprise sending a signal to the first encoding system, wherein the signal comprises instructions for the first encoding system to insert at least part of the second encoded data stream into at least a part of the second portion. The method may further comprise inhibiting the first encoding system from generating a number of default values for populating said second portion of data, said number being associated with the size of the at least part of the second encoded data stream to be inserted. The method may further comprise generating a modified first encoded data stream by modifying the first encoded data stream based at least in part on the second encoded data stream. The method may further comprise multiplexing the modified first encoded data stream with the second encoded data stream to generate a multiplexed data stream for transmission to a decoding system. Encoding the sequence of frames using a first encoding system may be performed in accordance with a first encoding algorithm, encoding the second sequence of frames associated with the sequence of frames using a second encoding system may be performed in accordance with a second encoding algorithm. The first encoding algorithm may be a Motion Picture Expert Group (MPEG)-based algorithm, and the second encoding algorithm may not be an MPEG-based algorithm. The second sequence of frames associated with the sequence of frames is a difference between the sequence of frames and a re-constructed version of the first encoded data stream.

The second sequence of frames may be up-scaled before or after encoding by the second encoding algorithm or second encoder.

According to another aspect, there is provided a method for encoding a sequence of frames of a data signal, the method comprising: receiving a first sequence of frames encoded using a first encoding system; encoding a second sequence of frames using a second encoding system, wherein the second sequence of frames is an up-scaled version of the first sequence of frames; wherein the first encoding system is adapted to generate a first encoded data stream according to a first bit rate; wherein the second encoding system is adapted to generate a second encoded data stream according to a second bit rate; and wherein the method further comprises adaptively modifying at least one of: the first bit rate and the second bit rate, according at least in part on at least one of: a measure of complexity for the sequence of frames and an indication of use of default values by at least one of the two encoding systems.

The method may include down-sampling the sequence of frames to create a down-sampled sequence of frames for encoding by the first encoding system. The method may further include providing the first encoding system with the down-sampled sequence of frames, wherein said down-sampled sequence of frames is to be processed by the first encoding system to generate the first sequence of frames.

According to another aspect, there is provided a system for encoding a sequence of frames of a data signal, the system comprising: a first encoding system and a second encoding system. The first encoding system comprising: a first encoder configured to encode a first sequence of frames according to a first encoding algorithm, wherein the first sequence of frames is a down-scaled version of the sequence of frames; and a first rate control unit configured to control a first bit rate at which the first encoder encodes said first sequence of frames. The second encoding system comprising: a second encoder configured to encode a second sequence of frames according to a second encoding algorithm, wherein the second sequence of frames is an up-scaled version of the first sequence of frames; and a second rate control unit configured to control a second bit rate at which the second encoder encodes said second sequence of frames associated with the sequence of frames. Further features and advantages will become apparent from the following description of embodiments, given by way of example only, which is made with reference to the accompanying drawings.

DETAILED DESCRIPTION

Figure 1:
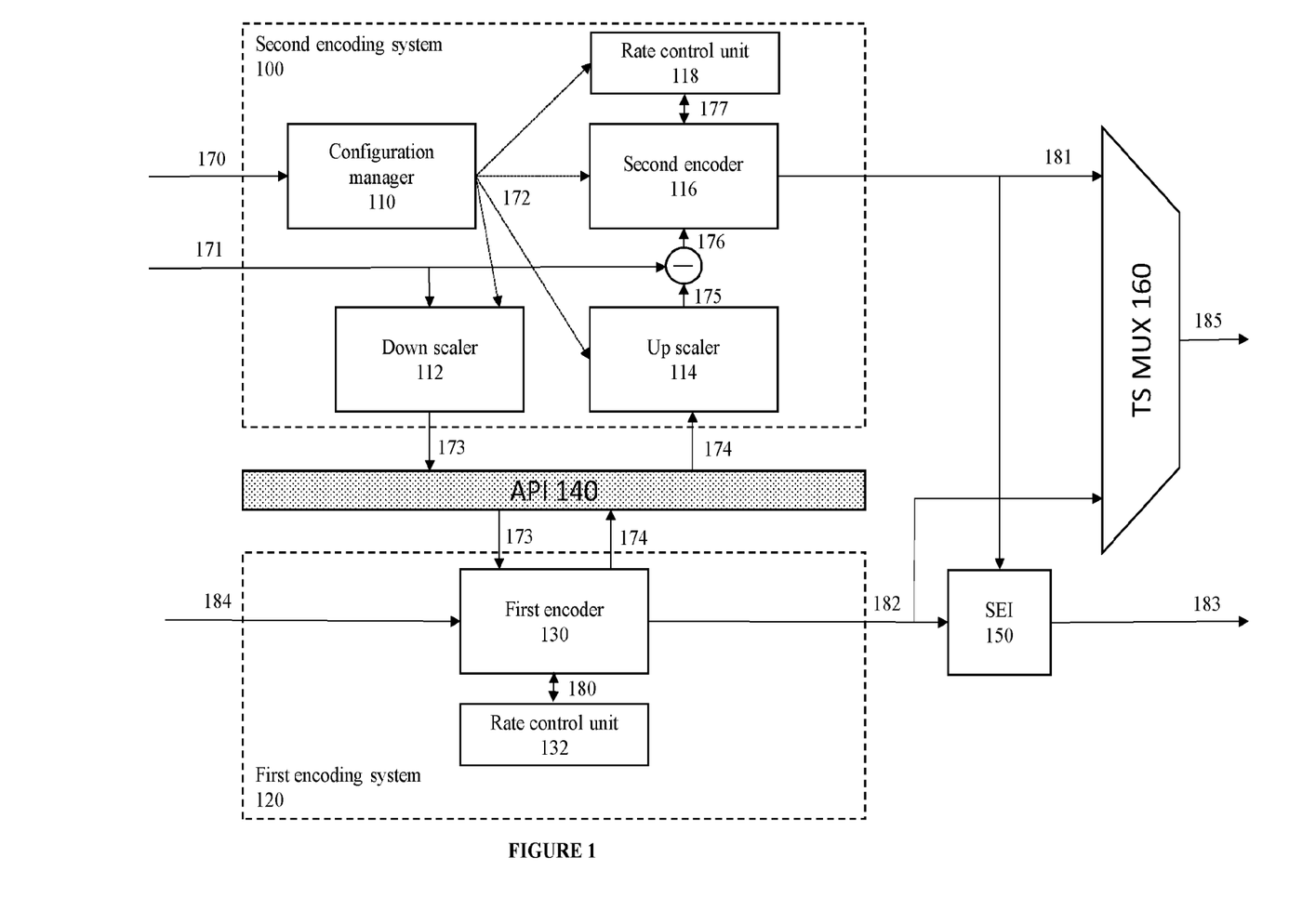
FIG. 1 shows a schematic block diagram of an example of an encoder system in accordance with an embodiment of the present invention.

Referring to FIG. 1, there is shown a schematic block diagram of an example of an encoder system in accordance with an embodiment of the present invention.

In an example, second encoding system receives a configuration stream which is then used by configuration manager to send control signals to configure the various elements of the second encoding system, namely down scaler, up scaler, second encoder and rate control unit. The configuration stream includes parameters which relate to specific configuration settings of the second encoding system. For example, these parameters include parameters relating to down-scaling and/or up-scaling operations (e.g., type of filters, filter parameters), bit rate parameters, information about the size of the data stream (e.g., resolution, frame rate, etc.) and other relevant parameters. Second encoding system also receives a data stream which needs to be encoded. The data stream could correspond to a stream of raw data from a source. For simplicity and convenience, in the description we will assume that data stream is a video data stream generated by a video recording device at a certain level of quality. For example, the encoded data could include any other type of data, including a sound signal, multichannel sound signal, picture, two-dimensional image, multi-view video signal, 3D video signal, volumetric signal, volumetric video signal, medical imaging signal or a signal with more than four dimensions, and all the apparatuses, systems and methods described herein should apply mutatis mutandis to those other types of data signals.

Data stream is then provided to a down scaler which produces a data stream at a lower level of quality, i.e. reduced resolution data stream. For example, data stream could be a video signal at 1920×1080 p, whereas the reduced resolution data stream could be the same video signal reduced to 960×540 p. The reduced resolution data stream is transmitted via API to a first encoding system which includes a first encoder and a rate control unit. Reduced resolution data stream is then encoded by first encoder using a first encoding algorithm (e.g., a standard-based MPEG encoding algorithm such as H.264). The first encoder outputs two streams, a first stream corresponding to an encoded version of the reduced resolution data stream, namely encoded data stream, and a second stream corresponding to a decoded version of the encoded data stream, namely decoded data stream. The latter is then provided via API to up scaler which produces an up-scaled data stream. Importantly, the resolution of data stream and that of up-scaled data stream are equivalent.

At this point, a difference is taken between data stream and up-scaled data stream to produce a difference data stream. The difference data stream is encoded using a second encoder. Said second encoder typically uses a second encoding algorithm. Such second encoding algorithm takes difference data stream, applies a specific set of transformation matrices and encodes the resulting transformed data stream using an entropy encoder to produce an encoded reconstruction data stream. The second encoding algorithm may also include a quantization process before use of the entropy encoder. A full discussion on this second encoding algorithm, how it works, and what type of matrices are used is described in International patent application Pub. No. WO 2013/171173 which is incorporated herein by reference. Said reconstruction data stream can also include information on how to reconstruct a rendition of data stream starting from a decoded version of encoded data stream.

Reconstruction data stream can be provided to a supplemental enhancement information (SEI) unit to produce data stream. Typically, the SEI unit is adapted to combine into a single elementary stream two or more SEI encapsulated streams, in the present case reconstruction data stream and encoded data stream. The encapsulation may be made by the SEI unit directly, or it could be fed to the SEI unit after encapsulation. The functioning of the SEI is based on standards such as ITU-T H.264. Alternatively (or in addition), encoded data stream and reconstruction data stream are multiplexed together by transport stream multiplexer to produce a multiplexed transport data stream. Alternatively, or in addition (but not shown in the Figure) single elementary stream and reconstruction data stream can be multiplexed together by transport stream multiplexer (or another transport stream multiplexer) to produce a multiplexed transport data stream.

The reconstruction data stream provides some significant advantages, some of which are explained here. A first advantage is to allow for the reproduction after decoding at the decoder side of a first quality and/or resolution video stream (e.g., High Definition, HD) starting from a second quality and/or resolution video stream (e.g., Standard Definition, SD) which would be otherwise provided by decoding only the encoded data stream produced by the first encoding system, the first quality and/or resolution being higher than the second quality and/or resolution. The overall bit rate used by the combination of the reconstruction data stream and the encoded data stream is lower than the bit rate which would be required by the first encoder to produce an encoded data stream which, when decoded and played at the decoder side, would result in a video stream of quality and/or resolution comparable to that of the first quality and/or resolution. Another advantage it that is allows back-compatibility with existing decoding system and/or compatibility with multiple device types, whereby one existing decoding system could decode based only on the encoded data stream and another existing device system could decode based on the on both the encoded data stream and the reconstruction data stream.

The multiplexed data stream and/or the single elementary stream is then sent over a transmission channel (e.g., over the air, cable, etc.) to a decoding system (not shown) which would then use the combination of encoded data stream and reconstruction data stream to reconstruct a rendition of the original data stream. In particular, encoded data stream is provided to a first decoder which decodes encoded data stream using a decoding mechanism which corresponds to the encoding mechanism used by the first encoder (e.g., a standard-based MPEG decoding algorithm such as H.264). The stream so decoded is then used as a "base" layer by a second decoder which combines it with reconstruction data stream to reconstruct a rendition of the original data stream. This second decoder uses a decoding mechanism which corresponds to the encoding mechanism used by the second encoder. More details on the encoding and decoding mechanisms, as well as on the overall mechanisms described above can be found in International patent application Pub. No. WO 2014/170819 which is incorporated herein by reference.

The ratio between the bit rate allocated and/or associated with the first data stream (e.g., encoded data stream) encoded with first encoding system and the bit rate allocated and/or associated with the second data stream (e.g., reconstruction data stream) encoded with the second data system is an important factor in ensuring that the quality of the reconstructed rendition of the original data stream is optimised whilst the bit rate of the multiplexed data stream is kept under control. A typical range of ratio values is between 60:40 and 90:10, where the first number indicates the percentage of bit rate allocated and/or associated with the first data stream and the second number indicates the percentage of bit rate allocated and/or associated with the second data stream. A potential ratio value is 70:30.

In the specific example of FIG. 1, each encoder may be provided with a corresponding rate control unit which is used to control the data rate produced by the respective encoder during the encoding process. In particular, rate control unit controls the data rate of second encoder, with rate control unit controlling the data rate of first encoder.

Importantly, rate control unit typically interacts with first encoder to ensure that encoded data stream is such that a certain reference bit rate (e.g., a Constant Bit Rate CBR) is maintained. Rate control units are well known in the art. An example of how they work is described in "A Generalized Hypothetical Reference Decoder for H.264/AVC", IEEE Transactions On Circuits and Systems for Video Technology, Vol.

13, No. 7, July 2003 by J. Ribas-Corbera et. Al., whose contents are incorporated herein by reference. In particular, this paper describes the concept/strategy of the leaky bucket. This rate control technique looks at a rate of data generated by an encoder and a rate of encoded data to be sent by the encoder at a specific rate (e.g., CBR). Since the rate of data generated by the encoder is typically variable over time, the amount of encoded data to be sent by the encoder may fall below a threshold as the encoded data are sent at said specific rate. For example, if the specific rate is a CBR of 3 Mbits/s, and the encoder generates for the first two seconds 6 Mbits and for the next four seconds 10 Mbits, that implies that for the first two seconds the bucket should remain at the same level it was before generation of those 6 Mbits of encoded data (since the data are transmitted at a constant bit rate of 3 Mbit/s) but then for the next four seconds the level of encoded data in the bucket would reduce by 2 Mbits (as there would be 12 Mbits of encoded data transmitted with "only" 10 Mbits of data generated over the same period). If the level of encoded data available for transmission falls below a certain threshold, the rate control unit would instruct the encoder to "compensate" for this shortfall of available encoded bits by generating more encoded bits. This, for example, could be done by changing the encoding parameters such as QP in order for the encoder to use more bits for encoding. If the encoder is not capable of generating additional encoding bits to move the level of available encoded bits above the threshold, then the rate control unit would enable generation of default bits (e.g., zeros) to "fill" the bucket of available data, thus ensuring that the constant bit rate of transmission is maintained. Conversely, there could also be a higher threshold that should be monitored to avoid that there are too many available encoded bits compared to the rate at which they can be transmitted, as in that case it would create a problem at the decoder side where frames to be decoded could be dropped as a consequence. For example, if the level of encoded data available for transmission goes above a certain threshold, the rate control unit would instruct the encoder to generate less encoded bits by, for example, changing the QP so that a less finer quantization is performed.

During experimental tests performed on video signals (e.g., a sequence of video frames) it was observed that in scenes with high spatial complexity and low temporal complexity the first encoder required a low bit rate, and therefore only a small percentage of the available bit rate should be given to the first encoder allowing the second encoder to use a higher bit rate by reusing all or part of the remaining bit rate. On the other hand, in scenes with low spatial complexity but high temporal complexity it is best to give most of the available bit rate to the first encoder. In general, spatial complexity is inversely proportional to spatial correlation present within a single frame. In other words, high spatial complexity means that the elements in the scenes are less correlated (e.g., a scene where there are a large number of details of non-repetitive nature, for example a scene of a crowd at a football stadium) whereas low spatial complexity means that the elements in the scene are more correlated. Additionally, temporal complexity is inversely proportional to temporal correlation between frames. In other words, high temporal complexity means that consecutive frames are less correlated (e.g., they are significantly different, for example because many elements change positions and/or shapes), whereas low temporal complexity means that consecutive frames are more correlated.

One reason for this behaviour is that the first encoder may be optimised for utilising the underlying temporal correlation in a sequence of frames in an efficient manner which typically results in a better compression rate. For example, in the case MPEG-based encoding algorithms, a typical sequence of frames is encoded by having Group of Pictures (GOPs) in which an initial I-frame (e.g., a frame which can be decoded only using data encoded for that specific frame) is followed by a series of P-frames (i.e. frames which require data encoded from previous frames for decoding, but because of this allow for higher compression rates than I-frames) and/or B-frames (i.e., frames which require data encoded from previous and subsequent frames for decoding, but because of this allow for higher compression rates than I-frames and P-frames). The higher successive frames are correlated, the more P-frames and B-frames can be used, and therefore the encoder will require lower bit rates. On the other hand, the second encoder is usually one that maximizes spatial correlation, and therefore when the spatial correlation is higher, using a higher bit rate for the second encoder will allow to increase the quality of the reconstructed rendition of the original data stream by using more bits for the second data stream.

A further observation is that, when low bit rates are available and/or used for transmission, in order to have a sufficiently good level of quality for the reconstructed rendition of the original data stream in the event of temporally complex scenes, a big proportion of the available and/or used bit rate should be given to the first encoder (for example, equal or more than 85%). However, that would mean setting a ratio, in the current example of 85:15, which in turn implies that when for example there is a scene change with the new scene being very sharp (i.e., high spatial complexity) with low temporal complexity, it is likely that 15% of bit rate is not enough for the second encoder to provide a sufficient amount of reconstruction data over the reconstruction data stream for obtaining a sufficiently good level of quality for the reconstructed rendition of the original data stream. At the same time, because of the low temporal complexity the first encoder would only be using a small portion of bits it is allowed and generate filler in order not to underflow the decoder buffer. This filler correspond to "waste" bits which are only inserted in the bit stream in order to keep a constant bit rate but without any further benefit for the encoded sequence.

Accordingly, a possible solution would be to prevent the first encoder from putting the filler in the bit stream and instead adding bits from the reconstruction data stream so as to decrease the ratio and giving a bigger percentage of the available bit rate to the reconstruction data stream.

Figure 2:
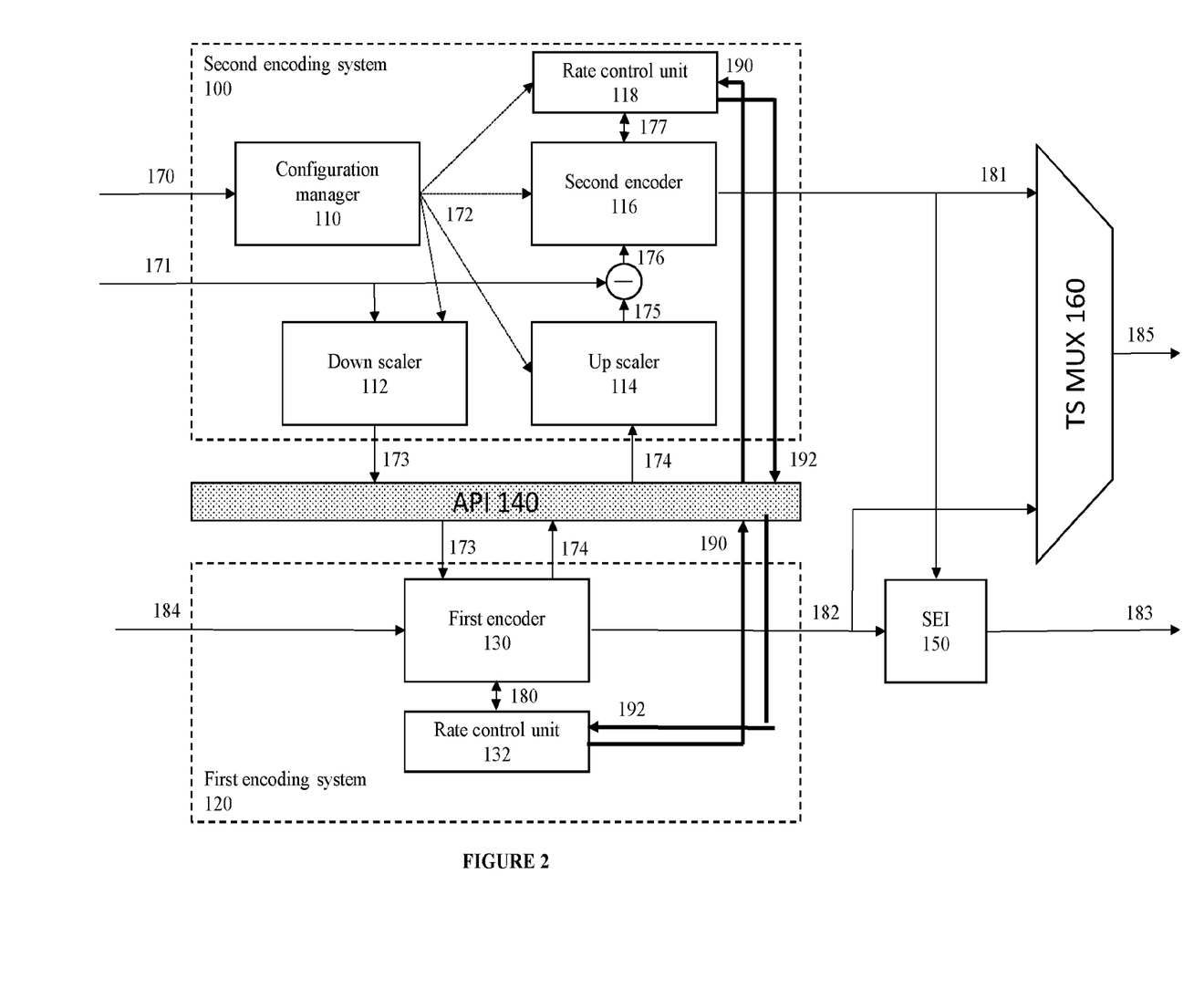
FIG. 2 shows a schematic block diagram of an example of an encoder system in accordance with an embodiment of the present invention.

In an exemplary embodiment as shown in FIG. 2, this is achieved by the first encoding system sending to the second encoding system via the API 140 additional information. This additional information may be generated by rate control unit based on a specific rate control mechanism associated with first encoder. Said additional information may comprise information about the size of the data stream encoded by the first encoder and the size of the filler that the first encoder has added or is planning to add into said encoded data stream. In one example, size of the data stream encoded by the first encoder can be expressed as the byte-size of the data stream encoded by the first encoder, whereas the size of the filler can be expressed as the byte-size that the first encoder desires to use for the base filler. This additional information is provided to the rate control unit in order to enable it to control the bit rate of the reconstruction data stream generated by the second encoder.

In particular, rate control unit, based on information about the combined transmission of the encoded data (e.g., encoded data stream and reconstruction data stream), can determine that the portion of the encoded data stream which is or is intended to be used for filler could be instead used for adding more data for the reconstruction data stream. For example, rate control unit can instruct second encoder to encode using more bits, thus increasing the bit rate of the reconstruction data stream, and consequently allowing for an improvement of the data stream once decoded. One mechanism for the described determination is the use of a "joint" leaky bucket which is a modification of the leaky bucket described above. In particular, the "joint" leaky bucket is used to keep track of the combined encoded data available for transmission (i.e., both the available encoded data generated by the second encoder 116 and the available encoded data generated by the first encoder) and maintain a specific combined transmission rate (e.g., a CBR). As in the mechanism described above, the rate control unit using said "joint" leaky bucket would control the second bit rate of the second encoder in order to ensure that the combined transmission rate is maintained. In particular, if detected that filler is or is to be inserted by the first encoding system, it would instruct second encoder to generate more bits (e.g., by having a finer granularity in the quantization process) in order to use them in place of all or part of the filler. Then, the rate control unit would send a signal to instruct the first encoding system via the API to avoid generating such filler. In addition, the rate control unit will also use the "joint" leaky bucket to determine whether to increase the number of bits generated by the second encoder when the level of combined available encoded data falls below a threshold. This is because in that case the second encoder could "compensate" for the shortfall by generating more bits (e.g., by having a finer granularity in the quantization process) thereby increasing the quality of the reconstruction data stream. If the second encoder is unable to further increase the bits used for encoding and the level of combined available encoded data is still below a threshold, then the rate unit may enable generation of filler by the second encoding system. In this way, the combined stream timing and buffer management does not change but an improvement in the quality of the video played at the decoder is achieved.

Alternatively (or in addition), rate control unit may decide that, based on the temporal and/or spatial complexity of the original data stream, it would be beneficial to dedicate more bits to the second encoder so as to generate more bits for the reconstruction data stream. For example, as described above, if the scene has high spatial complexity and low temporal complexity, then rate control unit may decide to dedicate more bits to the second encoder. In such case, upon verifying based on the additional information that the first encoding system intends to use some filler, rate control unit may send a signal to instruct the first encoding system via the API to avoid generating such filler. This signal may be sent to rate control unit which in turn may instruct the first encoder not to generate this filler. Alternatively, rate control unit may send a signal to indicate to the first encoding system via the API that a certain number of bits are required for the reconstruction data stream and should be "reserved" by the first encoding system. As a consequence, the first encoding system should only generate filler (if any) for up to the difference between the size of the filler that the first encoder has added or is planning to add into said encoded data stream and the number of bits required for the reconstruction data stream.

The temporal and/or spatial complexity may be measured in various manners. One possible way is by measuring the entropy associated with a frame and/or a sequence of frames within the original data stream. The entropy is defined as the expected value (e.g., average) of the information contained in a data set. For example, in the case of a frame, it can be seen as the expected value of the information contained in that frame, so that a frame with a high content of information (e.g., a frame showing a crowd in a stadium) will have a high entropy. In the case of a sequence of frames, it could be seen as the expected value of the information across frames (e.g., a sequence of frames with fast moving objects). The measured entropy is compared against a threshold, and if above said threshold the corresponding complexity is determined as being high. Conversely, if below said threshold, the corresponding complexity is determined as being low. Of course, multiple thresholds could be used, for example two thresholds, a higher one above which complexity is determined to be high, and a lower one below which complexity is determined to be low. The measured entropy could refer to a spatial entropy (e.g., the entropy within a frame), a temporal entropy (e.g., the entropy between frames), or a combination of the two. The thresholds could then be adapted accordingly to account for the exact type of corresponding complexity. For example, in the case of entropy associated both with a temporal and a spatial complexity, there could be either a combined set of thresholds (i.e., thresholds that take into account both spatial and temporal complexity—this would be the case, for example, of a measure of combined entropy which is both a function of spatial entropy and temporal entropy) or two pairs of sets of thresholds, one set per dimension of entropy (i.e., one set for spatial entropy, the other for temporal entropy). The latter would be the case of a measure of entropy which includes two separate entropy measurements, one for spatial entropy and another for temporal entropy.

In a further embodiment, signal may also include a minimum value for the Quantization Parameter (QP) which is to be used by the first encoder. The QP is used for quantizing data when performing lossy compression. This in turn would enable to control the size of the data stream encoded by the first encoder and of the size of the filler so that the rate of bit rate of the reconstruction data stream can be managed in a manner that ensures sufficiently good level of quality for the reconstructed rendition of the original data stream. For example, this mechanism could allow to decrease the size of the filler and therefore enable more bit rate for the reconstruction data stream, thus increasing the quality of the video played at the decoder side.

In a further embodiment, it was observed that for high complexity scenes (e.g., both temporally and spatially) both the first encoder and the second encoder would have problems in encoding in an efficient manner using a lossy compression mechanism, and therefore the resulting encoded stream is likely to produce artefacts when decoded. From a visual and perceptual perspective (e.g., from the perspective of a person viewing the stream once decoded) temporal and low resolution artefacts caused by the first encoder are more noticeable and affect the visual perception of the decoded stream, thus resulting in a perception of an overall low quality of the decoded stream and an unsatisfactory visual experience. Such artefacts are, for example, "blocky" scenes (i.e., scenes where blocks of the frames are either disappearing or whose boundaries are evident when viewing the frame) or black spots in the frame. Those temporal and low resolution artefacts negatively affect the visual perception of the decoded stream to a greater extent than if the stream once decoded was to lack in high resolution details (e.g., due to the lack of bit rate given to second encoder). Note that the latter are usually the details added when decoding the reconstruction data stream produced by the second encoding system. Accordingly, it was concluded that it may be better to use most of the combined bit rate for the first encoder (thus increasing the first bit rate), so that a lower QP could be used instead and therefore more bits were given to the encoded stream. Accordingly, when it is determined that the scene is highly complex, a signal can be sent from second encoding system to first encoding system via the API in order, for example, to lower the QP used by the first encoder. For example, this signal can be sent as part of signal.

Figure 3:
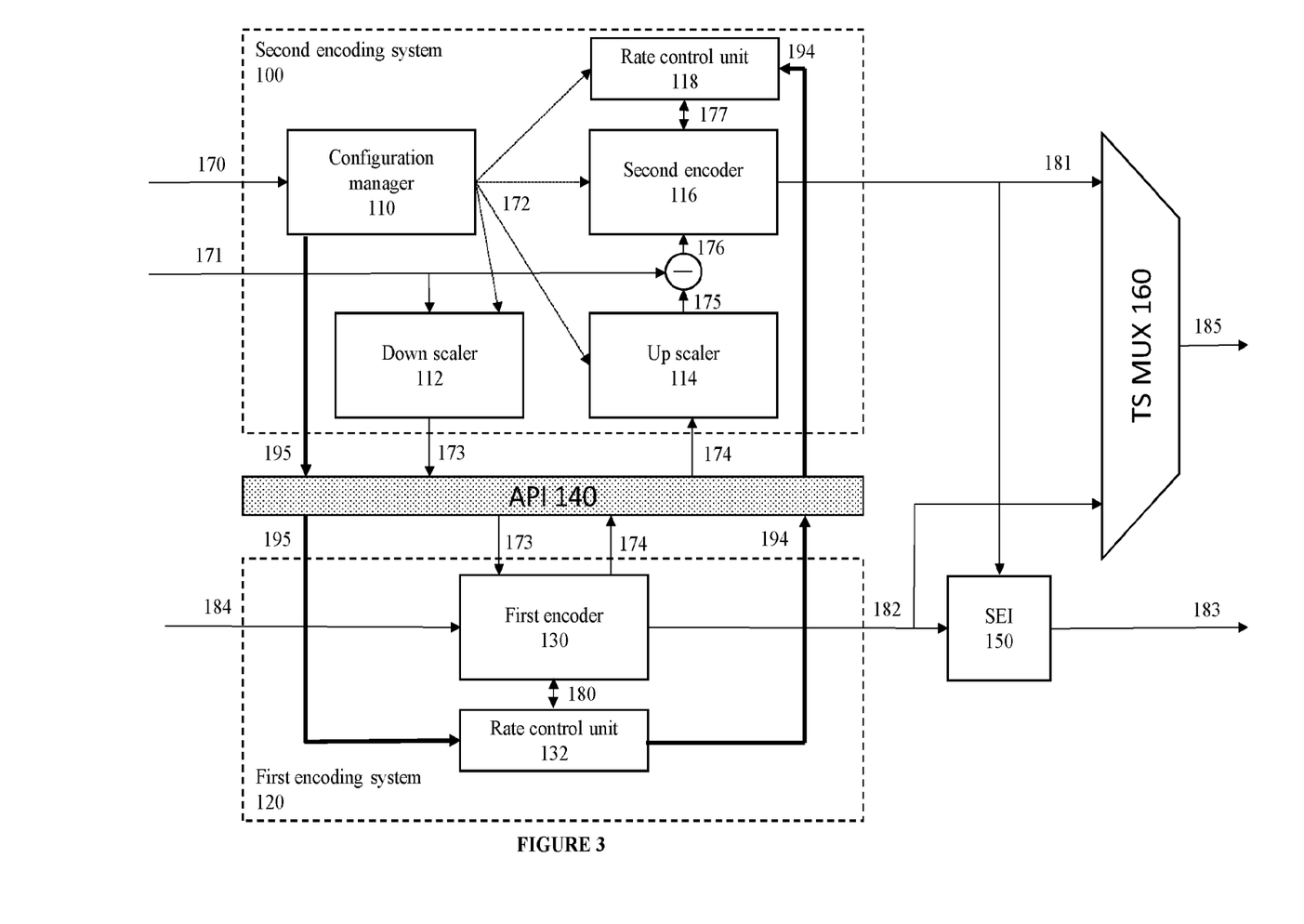
FIG. 3 shows a schematic block diagram of an example of an encoder system in accordance with an embodiment of the present invention.

In an exemplary embodiment as shown in FIG. 3, rate control unit may use some statistical analysis (e.g., look-ahead statistics) to determine the best ratio in order to ensure a sufficiently good level of quality for the reconstructed rendition of the original data stream. In this embodiment, rate control unit would simply send an instruction via API to rate control unit indicating the bit rate available for the second encoder. In turn, rate control unit would then use this indication to control the bit rate of the second encoder. In addition, the second encoding system may send a signal via API to the first encoding system, said signal indicating a request for a bit rate to be allocated to the second encoder and/or a measure of complexity of the scene. For example, the second encoding system may determine an optimal bit rate to be allocated to the second encoder in order to ensure a sufficiently good level of quality for the reconstructed rendition of the original data stream. In addition, the second encoding system may determine an optimal bit rate to be allocated to the second encoder based on an estimated complexity for a scene (spatial and/or temporal complexity). The optimal bit rate could be determine as discussed above. The second encoding system may also estimate the complexity for a scene and generate a measure of complexity based on said estimate. The measure of complexity can be used by the first encoding system (e.g., by the rate control unit) to control the bit rate for the first encoder and/or for determining bit rate to be made available for the second encoder.

Figure 4:
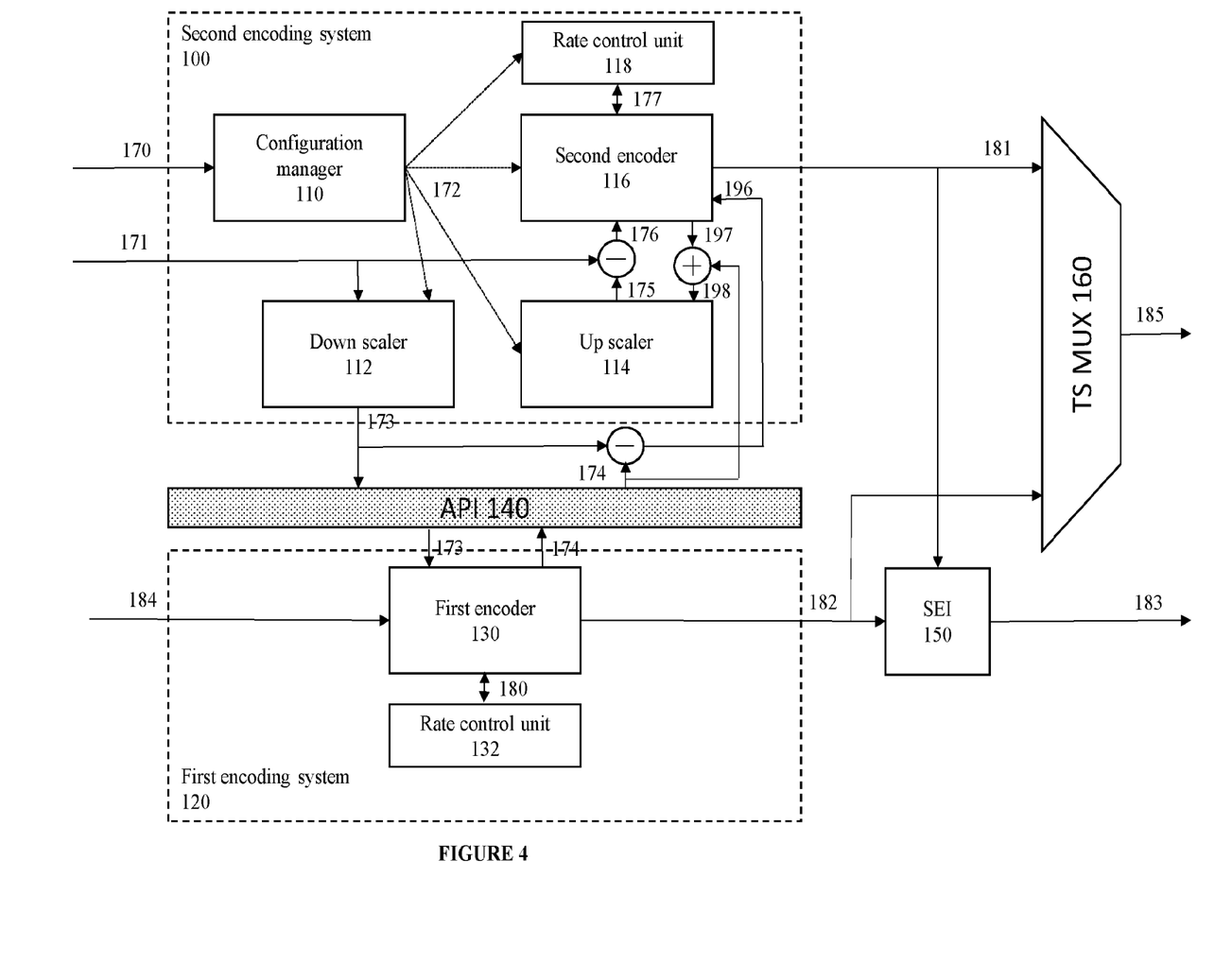
FIG. 4 shows a schematic block diagram of an example of an encoder system in accordance with an embodiment of the present invention

FIG. 4 shows a variation which could be made to any of the other Figures, in particular in relation to what happens after decoded data stream is received by the second encoding system. Rather than being up-scaled by up-scaler, a difference is taken between reduced resolution data stream and decoded data stream. Said differential data stream represents a correction that would need to be made to decoded data stream in order to obtain reduced resolution data stream. This differential data stream is encoded by second encoder to generate an encoded correction data stream (not shown) by using the second encoding algorithm as described above. Said corrected encoded data stream could then be added to the final output of the second encoder in addition (or together with) reconstruction data stream, for example to form a pair of data streams to reconstruct at the decoder. Said encoded data stream (not shown) is first decoded to generate a decoded corrected data stream, which is then summed to decoded data stream to generate a corrected encoded data stream. Said corrected decoded data stream represents a corrected version of the decoded data stream. This corrected decoded data stream is then up-sampled to generate up-scaled data stream, and then processed as described above in relation to FIG. 1. The additional processing described above with reference to FIG. 4 allows for having the second encoding system generating two data streams for combination with the encoded data stream, a first data stream (the not shown encoded correction data stream) to "correct" the encoded data stream and bring it, when reconstructed at the decoder, to the level of quality of reduced resolution data stream, the second data stream (reconstruction data stream) to "enhance" the encoded data stream after correction and bring it, when reconstructed at the decoder, to the level of quality of the data stream. In other words, the decoder can either simply "correct" the encoded data stream, or "correct" and "enhance" to a better resolution the encoded stream.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

The use of a modular structure such as the one depicted in any of the Figures provides also an advantage from an implementation and integration point of view, enabling a simple integration into legacy systems as well as compatibility with legacy systems. By way of example, the second encoding system could be embodied as a plug-in (including libraries and/or source code) to an existing firmware and/or software which already embodies legacy first encoding system (for example one that is already installed in legacy encoder systems). The first encoding system and the second encoding system may be embodied as a single system, or as two separate systems. In addition, the API could need to be included, and the necessary modifications to the first encoding system would need to be made based on the specific embodiment required. The first encoding system may provide to the second encoding system the encoded data stream or the decoded version of the encoded data stream.

It is to be understood that any feature described in relation to any one embodiment may be used alone, or in combination with other features described, and may also be used in combination with at least one feature of any other of the embodiments, or any combination of any other of the embodiments. Furthermore, equivalents and modifications not described above may also be employed without departing from the scope of the invention, which is defined in the accompanying claims.

The invention claimed is:

1. A method for encoding a sequence of frames of a data signal, the method comprising:
receiving a first sequence of frames encoded using a first encoding system;
encoding a second sequence of frames associated with the sequence of frames using a second encoding system, wherein the second sequence of frames is an up-scaled version of the first sequence of frames;
wherein the first encoding system is adapted to generate a first encoded data stream according to a first bit rate;
wherein the second encoding system is adapted to generate a second encoded data stream according to a second bit rate; and
wherein the method further comprises increasing the second bit rate, upon an indication of a use of, or of an intention to use, filler values for keeping a constant encoding rate by the first encoding system, and using bits produced by the increased second bit rate in place of all or part of the filler values to maintain a specific combined transmission rate.

2. The method of claim 1, further comprising downsampling the sequence of frames to create a down-sampled sequence of frames for encoding by the first encoding system.

3. The method of claim 2, further comprising:
providing the first encoding system with the down-sampled sequence of frames, wherein said down-sampled sequence of frames is to be processed by the first encoding system to generate the first sequence of frames.

4. The method of any of claim 1, further comprising:
generating in the first encoded data stream a first portion of data comprising data corresponding to the sequence of frames encoded according to a first encoding algorithm; and
depending on whether it is needed to maintain the first bit rate in accordance with a first rate control algorithm, preparing to generate a second portion of data comprising one or more filler values.

5. The method of claim 4, further comprising:
sending instructions for the first encoding system to reduce the size of the second portion of data.

6. The method of claim 5, further comprising:
generating by the first encoding system a number of filler values for populating said second portion of data, said number being less than a number of default values which would have been generated in the absence of said instructions.

7. The method of claim 4, further comprising at least one of:
sending instructions for the first encoding system not to generate any filler values for the second portion of data; and
sending instructions for the first encoding system to replace one or more of any generated filler values with at least part of the second encoded data stream; and
sending instructions for the first encoding system to insert at least part of the second encoded data stream into at least a part of the second portion.

8. The method of claim 7, further comprising:
when sending instructions for the first encoding system to replace one or more of the generated filler values with at least part of the second encoded data stream, replacing by the first encoding system one or more of the generated filler values with at least part of the second encoded data stream.

9. The method of claim 7, further comprising:
when sending instructions for the first encoding system to insert at least part of the second encoded data stream into at least a part of the second portion, inhibiting the first encoding system from generating a number of filler values for populating said second portion of data, said number being associated with the size of the at least part of the second encoded data stream to be inserted.

10. The method of claim 3, wherein encoding the sequence of frames using a first encoding system is performed in accordance with a first encoding algorithm, and wherein encoding the second sequence of frames associated with the sequence of frames using a second encoding system is performed in accordance with a second encoding algorithm.

11. The method of claim 10, wherein the first encoding algorithm is in compliance with a Motion Picture Expert Group (MPEG) standard for video coding, and the second encoding algorithm is not in compliance with an MPEG standard for video coding.

12. The method of claim 3, wherein the second sequence of frames associated with the sequence of frames is a difference between the sequence of frames and a re-constructed version of the first encoded data stream.

13. A video encoder comprising:
one or more processors; and
one or more computer-readable hardware storage media having thereon computer-executable instructions that are structured such that, when executed by the one or more processors, cause the video encoder to:
receive a first sequence of frames encoded using a first encoding system;
encode a second sequence of frames associated with the sequence of frames using a second encoding system, wherein the second sequence of frames is an up-scaled version of the first sequence of frames;

wherein the first encoding system is adapted to generate a first encoded data stream according to a first bit rate;

wherein the second encoding system is adapted to generate a second encoded data stream according to a second bit rate; and wherein the video encoder is further caused to increase the second bit rate, upon an indication of a use of, or of an intention to use, filler values for keeping a constant encoding rate by the first encoding system, and using bits produced by the increased second bit rate in place of all or part of the filler values to maintain a specific combined transmission rate.

14. A computer readable hardware storage medium having recorded thereon computer readable instructions which, when the computer readable instructions are executed by a processor of a computing system, cause the computing system to:

receive a first sequence of frames encoded using a first encoding system;

encode a second sequence of frames associated with the sequence of frames using a second encoding system, wherein the second sequence of frames is an up-scaled version of the first sequence of frames;

wherein the first encoding system is adapted to generate a first encoded data stream according to a first bit rate;

wherein the second encoding system is adapted to generate a second encoded data stream according to a second bit rate; and wherein the computing system is further caused to increase the second bit rate, upon an indication of a use of, or of an intention to use, filler values for keeping a constant encoding rate by the first encoding system, and using bits produced by the increased second bit rate in place of all or part of the filler values to maintain a specific combined transmission rate.

\* \* \* \* \*